(12) United States Patent
Kwak et al.

(10) Patent No.: US 8,050,679 B2
(45) Date of Patent: *Nov. 1, 2011

(54) METHOD AND APPARATUS FOR INDICATING PREFERRED LAYER INFORMATION IN MULTIMEDIA BROADCAST/MULTICAST SERVICE (MBMS)

(75) Inventors: No-Jun Kwak, Seoul (KR); Kyeong-In Jeong, Suwon-si (KR); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

This patent is subject to a terminal disclaimer.

(21) Appl. No.: 12/149,027

(22) Filed: Apr. 25, 2008

(65) Prior Publication Data

US 2008/0207211 A1    Aug. 28, 2008

Related U.S. Application Data

(63) Continuation of application No. 11/226,398, filed on Sep. 15, 2005, now Pat. No. 7,539,493.

(30) Foreign Application Priority Data

Sep. 15, 2004  (KR) .............................. 2004-73972
Nov. 5, 2004   (KR) .............................. 2004-89671
Dec. 14, 2004  (KR) .............................. 2004-105897

(51) Int. Cl.
*H04W 36/00*    (2009.01)

(52) U.S. Cl. ..... 455/436; 455/503; 455/421; 455/432.1; 455/450; 455/509; 455/456.1; 455/456.3; 370/331; 370/401; 370/473; 370/475; 370/312; 370/432; 370/338; 370/328

(58) Field of Classification Search .................. 455/503, 455/436, 421, 432.1, 450, 509, 456.1, 456.3; 370/331, 401, 473, 475, 312, 432, 338, 328
See application file for complete search history.

(56) References Cited

U.S. PATENT DOCUMENTS 7,436,811 B2 *  10/2008  Putcha et al. ................. 370/343
(Continued)

FOREIGN PATENT DOCUMENTS

JP    2006-042354    2/2006
(Continued)

OTHER PUBLICATIONS

LG Electronics, R2-041538 *Discussion on FLC and Cell Load*, 3GPP TSG-RAN WG2 Meeting #43, Aug. 16-20, 2004, Prague, Czech Republic.

(Continued)

*Primary Examiner* — Kwasi Karikari
(74) *Attorney, Agent, or Firm* — Roylance, Abrams, Berdo & Goodman, L.L.P.

(57) ABSTRACT

A method is disclosed for transferring preferred frequency information in a mobile communication system which establishes a preferred frequency layer and a non-preferred frequency layer for a Multimedia Broadcast/Multicast Service (MBMS) service. The method involves the steps of determining at least one preferred frequency of the MBMS service when a session of the MBMS service starts, generating the preferred frequency information representing said at least one preferred frequency, and transmitting the preferred frequency information to at least one serving radio network controller for managing communication of user equipments intended to receive the MBMS service.

23 Claims, 10 Drawing Sheets

U.S. PATENT DOCUMENTS

| | | | |
|---|---|---|---|
| 7,539,493 B2 * | 5/2009 | Kwak et al. | 455/436 |
| 2005/0233760 A1 * | 10/2005 | Voltolina et al. | 455/503 |
| 2006/0062237 A1 * | 3/2006 | Kim | 370/432 |

FOREIGN PATENT DOCUMENTS

| | | |
|---|---|---|
| WO | WO-2004-017580 A1 | 2/2004 |

OTHER PUBLICATIONS

NTT DoCoMo, R2-04616 *Frequency Dispersion After MBMS Reception*, 3GPP TSG-RAN WG2 Meeting #43, Aug. 16-20, 2004, Prague, Czech Republic.

* cited by examiner

| IE/Group Name | Presence | Range | Semantics Description |
|---|---|---|---|
| Message Type | M | | |
| Transaction ID | M | | |
| MBMS SERVICE ID (TMGI) | M | | |
| Preferred layer information | | 1 | |
| >Choice preferred layer area | | | |
| >>RNC | | 1 | |
| >>>DL UARFCN | M | <1...maxPL> | |
| >>Node B | | <1...maxNodeB> | |
| >>>Node B ID | M | | |
| >>>DL UARFCN | M | <1...maxPL> | |
| >>CELL group | | <1...maxCellGroup> | |
| >>>Cell group ID | M | 11 | |
| >>>DL UARFCN | M | <1...maxPL> | |
| >>CELL | | <1...maxCell> | |
| >>>CELL ID | M | | |
| >>>DL UARFCN | M | <1...maxPL> | |
| Criticality Diagnostics | O | | |

FIG.4A

| IE/Group Name | Presence | Range | Semantics Description |
|---|---|---|---|
| Message Type | M | | |
| Transaction ID | M | | |
| C_ID | M | | |
| MBMS Bearer Service List | | 1...<maxnoofMBMS> | |
| >MBMS Service ID (TMGI) | M | | |
| >Transmission Mode | M | | |
| >UE Information for MBMS | | 1...<maxnoofUEs> | |
| >>S-RNTI | O | | |
| >Preferred layer | | 1...<maxPL> | |
| >>DL UARFCN | O | | |

FIG.4B

| IE/Group Name | Presence | Range | Semantics Description |
|---|---|---|---|
| Message Type | M | | |
| Transaction ID | M | | |
| MBMS SERVICE ID (TMGI) | M | | |
| Preferred layer information | | 1 | |
| >Default Preferred frequency information | M | | Default preferred frequency in a RNC. |
| >> DL UARFCN | M | 1 | |
| >Additional Preferred frequency information | O | | Preferred frequency different from default preferred frequency |
| >> DL UARFCN | M | <1...maxAddFreq> | |
| >>>CELL ID | M | <1...maxCells> | Cells whose preferred frequency is DL UARFCN above. |
| Criticality Diagnostics | O | | |

METHOD AND APPARATUS FOR INDICATING PREFERRED LAYER INFORMATION IN MULTIMEDIA BROADCAST/MULTICAST SERVICE (MBMS)

PRIORITY

This application is a continuation of U.S. patent application Ser. No. 11/226,398, filed Sep. 15, 2005 now U.S. Pat. No. 7,539,493 and claims the benefit under 35 U.S.C. §119(a) of Korean Patent Applications entitled "Method and Apparatus for indicating Preferred Layer Information in MBMS" filed in the Korean Intellectual Property Office on Sep. 15, 2004 and assigned Serial No. 2004-73972, filed on Nov. 5, 2004 and assigned Serial No. 2004-89671, and filed on Dec. 14, 2004 and assigned Serial No. 2004-105897, the entire contents of which are hereby incorporated by reference.

BACKGROUND OF THE INVENTION

1. Field of the Invention

The present invention relates to a Multimedia Broadcast/Multicast Service (MBMS). More particularly, the present invention relates to a method and an apparatus for informing User Equipments (UEs) in a cell dedicated channel (CELL_DCH) state of information on a specific preferred frequency when a session starts in a Frequency Layer Convergence (FLC) situation in which a MBMS is provided at the preferred frequency.

2. Description of the Related Art

At the present time, mobile communication systems using a wideband Code Division Multiple Access (CDMA) scheme is being developed for packet service communication for the transmission of mass storage data and multimedia broadcast/communication for the transmission of multimedia services other than conventional voice communication. Accordingly, in order to support the multimedia broadcast/communication, a MBMS service capable of providing a service to a plurality of UEs from one or a plurality of multimedia data sources has been discussed.

The term "MBMS service" typically refers to a service for transmitting the same multimedia data to a plurality of receivers through a wireless network. Herein, the receivers share one radio channel, so that radio transmission resources can be efficiently used. This type of MBMS service is a service capable of supporting multimedia transmission of realtime images and voices, still images, texts, and so on, while simultaneously providing voice and image data according to the multimedia transmission. This requires a large amount of resources. In a MBMS service, because the same data must be transmitted to a plurality of cells including users, a Point-to-Point (PP) connection or a Point-to-Multiple (PM) connection is used according to the number of users included in each cell.

Figure 1:
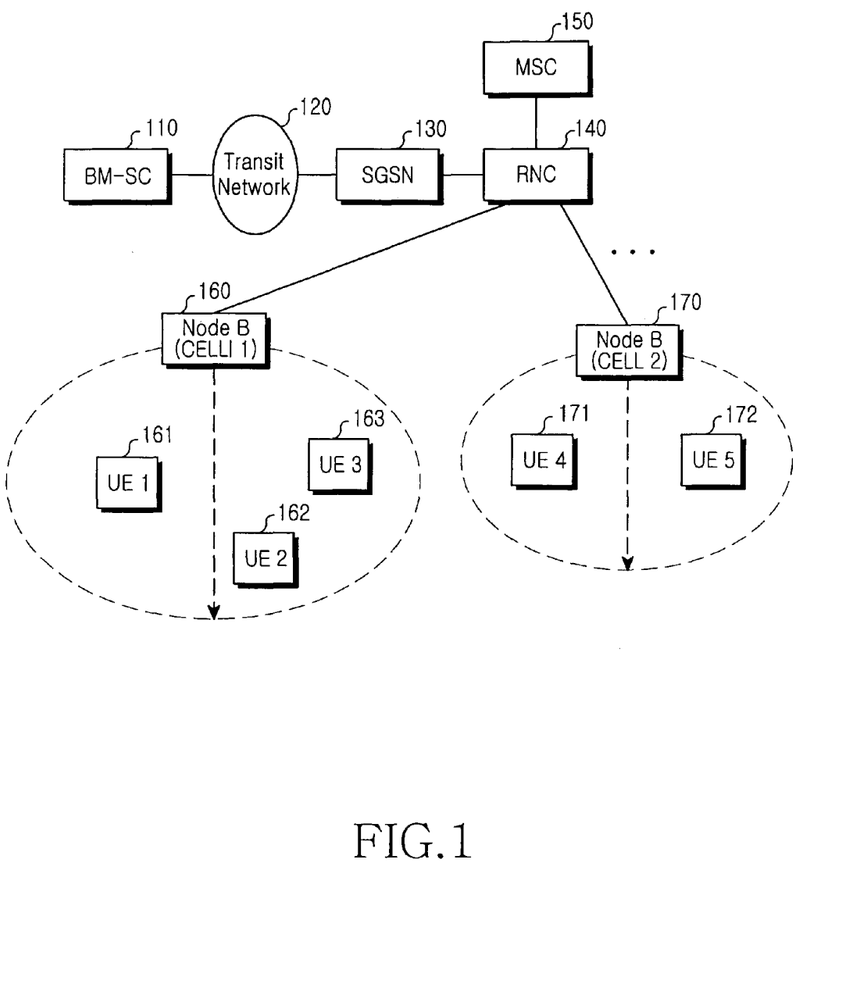
FIG. 1 is an exemplary block diagram illustrating a conventional network construction for a MBMS service in mobile communication network.

FIG. 1 is an exemplary block diagram schematically illustrating nodes joining the providing of a MBMS service in a mobile communication network. FIG. 1 shows an exemplary case obtained by applying the MBMS service to a $3^{rd}$ Generation Project Partnership (3GPP) system which corresponds to a standard of a $3^{rd}$ generation asynchronous mobile communication network scheme based on a Global System for Mobile Communication network (GSM) and a General Packet Radio Services (GPRS).

Referring to FIG. 1, UEs 161 through 163, 171 and 172 represent user equipments or subscribers capable of receiving the MBMS service, cells 160 and 170 represent physical or logical service areas respectively controlled by base stations, in other words, node Bs, for transmitting MBMS-related data to the subscribers by wire. A Radio Network Controller (RNC) 140 controls the cells 160 and 170, selectively transmits multimedia data to a specific cell, and controls radio channels having been established in order to provide the MBMS service. The RNC 140 is connected to the UEs 161 through 163, 171 and 172 by a Radio Resource Control (RRC) interface.

The RNC 140 is connected to a Packet Switched or Packet Service (PS) network such as the Internet through a Serving GPRS Support Node (SGSN) 130. Communication between the RNC 140 and the PS network is performed by a PS signaling. Specifically, a connection between the RNC 140 and the SGSN 130 will be referred to as an Iu-PS interface. The SGSN 130 controls the MBMS-related service of each subscriber. Representatively, the SGSN 130 plays a role of managing service charge-related data of each subscriber, selectively transmitting multimedia data to the specific RNC 140, and so on.

A Transmit Network 120 may provide a communication channel between a Broadcast Multicast Service Center (BM-SC) 110 and the SGSN 130, and be connected to an external network through a Gateway GPRS Support Node (GGSN). The BM-SC 110 is a source of MBMS data and makes its responsible for the scheduling of the MBMS data.

The RNC 140 is connected to a Circuit Switched (CS) network through a Mobile Switching Center (MSC) 150. The CS network denotes a legacy voice-based communication network based on the connection. Communication between the RNC 140 and the MSC 150 is performed by a CS signaling. Specifically, a connection between the RNC 140 and the MSC 150 will be referred to as an Iu-CS interface.

MBMS data streams generated from the BM-SC 110 are transferred to the UEs 161 through 163, 171 and 172 via the Transmit Network 120, the SGSN 130, the RNC 140 and the cells 160 and 170.

Further, a plurality of SGSNs and a plurality of RNCs corresponding to each SGSN may exist for one MBMS service. Each SGSN selectively transmits data to the RNCs and each RNC selectively transmits data to each cell. To accomplish this, each node stores a list (in case of the SGSN, a list of RNCs, in case of the RNC, a list of cells) of lower nodes to which data streams must be transferred and selectively transmits MBMS data to only the nodes stored in the list.

A MBMS system supports FLC technology capable of allocating a Preferred Frequency Layer (PL) to each of available MBMS services and allowing UEs using the MBMS services to receive a desired MBMS service at the PL if possible. It is preferred that the PL is constant for a whole service area, but it may be established differently based on each area due to frequency policies or cell situations.

Figure 2:
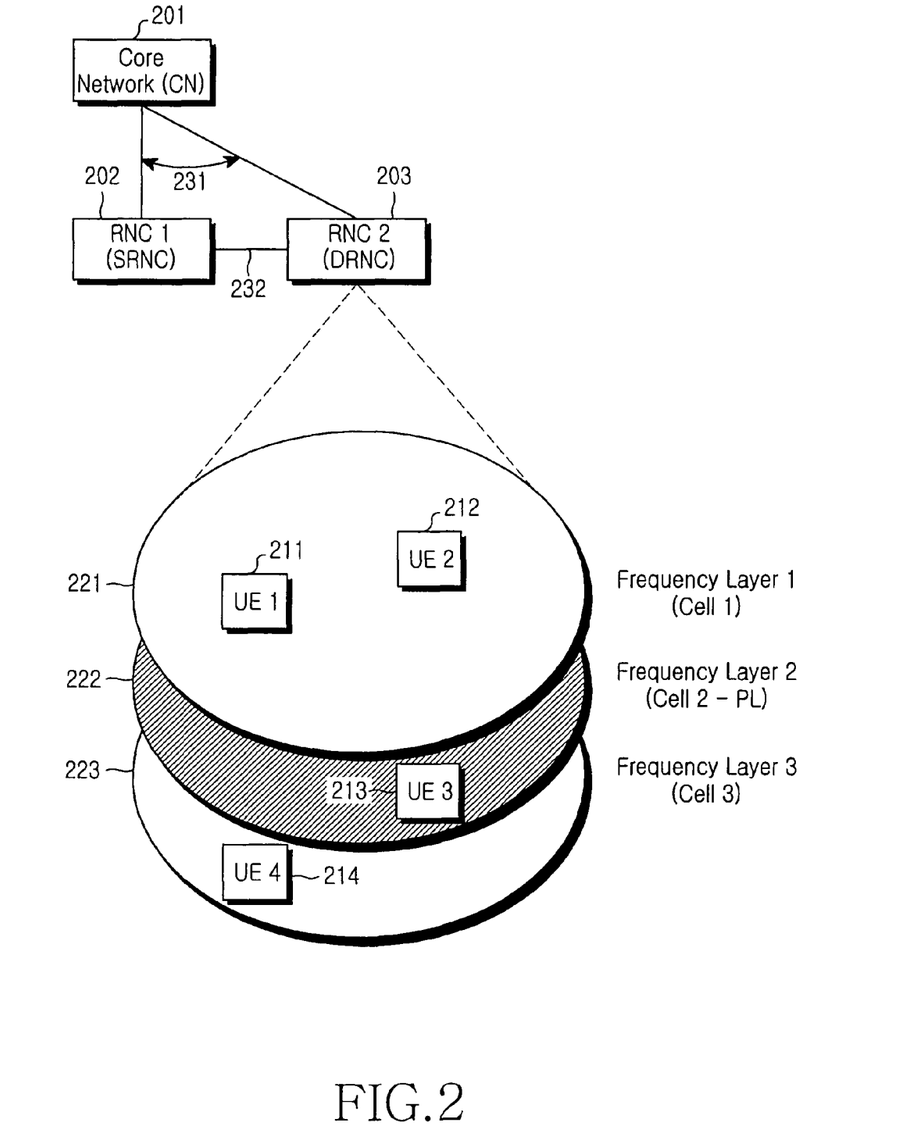
FIG. 2 is an exemplary diagram illustrating a conventional frequency layer structure under a FLC situation in a Multimedia Broadcast/Multicast Service (MBMS) system.

FIG. 2 is an exemplary diagram illustrating a conventional frequency layer structure under the FLC situation in a MBMS system.

In FIG. 2, three frequency layers 221 through 223 using different frequencies 1 through 3 spatially overlap, and a plurality of UEs 211 through 214 are stationary on the frequency layers 221 through 223 before the session of a MBMS service starts. The frequency layer 222 of the frequency layers 221 through 223 is set as a PL of the MBMS service.

A Core Network (CN) 201 represents a BM-SC, a transmit network, a MSC, a SGSN, and so on. A RNC 202 for managing the UEs 211 through 214 and a RNC 203 for managing the frequency layers 221 through 223 are connected to the CN 201. Further, a wire path 231 for connecting the CN 201 to the RNCs 202 and 203 will be referred to as an Iu interface, and a wire path 232 for connecting the RNC 202 to the RNC 203 will be referred to as an Iur interface. Herein, a node B is omitted, which exists between the RNC 203 and the UEs 211 through 214 in order to directly manage the frequency layers 221 through 223. The RNC 203 is a Drift RNC (DRNC) for directly managing the frequency layers 221 through 223 including the UEs 211 through 214 and the RNC 202 is a Serving RNC (SRNC) for managing communication of the UEs 211 through 214.

Because the UEs 211, 213 and 214 (Cell_DCH UEs) having received a service through a Dedicated Channel (DCH) do not read a MBMS Control Channel (MCCH), they cannot recognize PL information. Accordingly, it is necessary to provide technology by which the RNC 202 can inform the Cell_DCH UEs 211, 213 and 214 of the PL information through a Dedicated Control Channel (DCCH).

SUMMARY OF THE INVENTION

Accordingly, the present invention has been made to address the above-mentioned problems, and an exemplary object of the present invention is to provide a method and an apparatus in which a Drift Radio Network Controller (DRNC) having recognized the session start of a Multimedia Broadcast/Multicast Service (MBMS) service selects a Preferred Frequency Layer (PL) and informs a Serving Radio Network Controller (SRNC) of the PL.

Another exemplary object of the present invention is to provide a method and an apparatus in which a DRNC transfers PL information of a MBMS service to a SRNC by using a Radio Network System Application Part (RNSAP) procedure which uses a signaling bearer on an Iur interface.

In order to accomplish the aforementioned objects, according to one aspect of the present invention, a method is provided for transferring preferred frequency information in a mobile communication system which establishes a preferred frequency layer and a non-preferred frequency layer for a Multimedia Broadcast/Multicast Service (MBMS) service. The method comprises the steps of determining at least one preferred frequency of the MBMS service when a session of the MBMS service starts, constructing the preferred frequency information representing said at least one preferred frequency, and transmitting the preferred frequency information to at least one serving radio network controller for managing communication of user equipments intended to receive the MBMS service.

In order to accomplish the aforementioned objects, according to another aspect of the present invention, a method is provided for transferring preferred frequency information in a mobile communication system which establishes a preferred frequency layer and a non-preferred frequency layer for a Multimedia Broadcast/Multicast Service (MBMS) service. The method comprises the steps of receiving the preferred frequency information representing at least one preferred frequency of the MBMS service from a drift radio network controller for managing cells which include user equipments intended to receive the MBMS service when a session of the MBMS service starts, and notifying the user equipments intended to receive the MBMS service of said at least one preferred frequency according to the preferred frequency information.

In order to accomplish the aforementioned objects, according to further another aspect of the present invention, an apparatus is provided for transferring preferred frequency information in a mobile communication system which establishes a preferred frequency layer and a non-preferred frequency layer for a Multimedia Broadcast/Multicast Service (MBMS) service. The apparatus comprises a serving radio network controller for managing user equipments intended to receive the MBMS service, and a drift radio network controller for determining at least one preferred frequency of the MBMS service when a session of the MBMS service starts, constructing the preferred frequency information representing said at least one preferred frequency, and transmitting the preferred frequency information to the serving radio network controller, wherein the serving radio network controller receives the preferred frequency information from the drift radio network controller, and notifies the user equipments intended to receive the MBMS service of said at least one preferred frequency according to the preferred frequency information.

BRIEF DESCRIPTION OF THE DRAWINGS

The above and other exemplary objects, features and advantages of the present invention will be more apparent from the following detailed description taken in conjunction with the accompanying drawings in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described with reference to the accompanying drawings. In the following description of the present invention, a detailed description of known functions and configuration incorporated herein will be omitted for clarity and conciseness. Terms described in the following description are defined by taking functions thereof into consideration, so they may vary according to the intention of a user and an operator or depending on custom.

According to an exemplary embodiment of the present invention which will be described in detail, a Serving Radio Network Controller (SRNC) transfers Preferred Frequency Layer (PL) information to Cell Dedicated Channel User Equipments (Cell_DCH UEs) through a Dedicated Control Channel (DCCH) such that the Cell_DCH UEs can receive a Multimedia Broadcast/Multicast Service (MBMS) service when the session of the MBMS service starts. When a Drift Radio Network Controller (DRNC) differs from the SRNC, the DRNC transfers the PL information to the SRNC such that the SRNC can inform the UE of the PL information through a Radio Resource Control (RRC).

Figure 3:
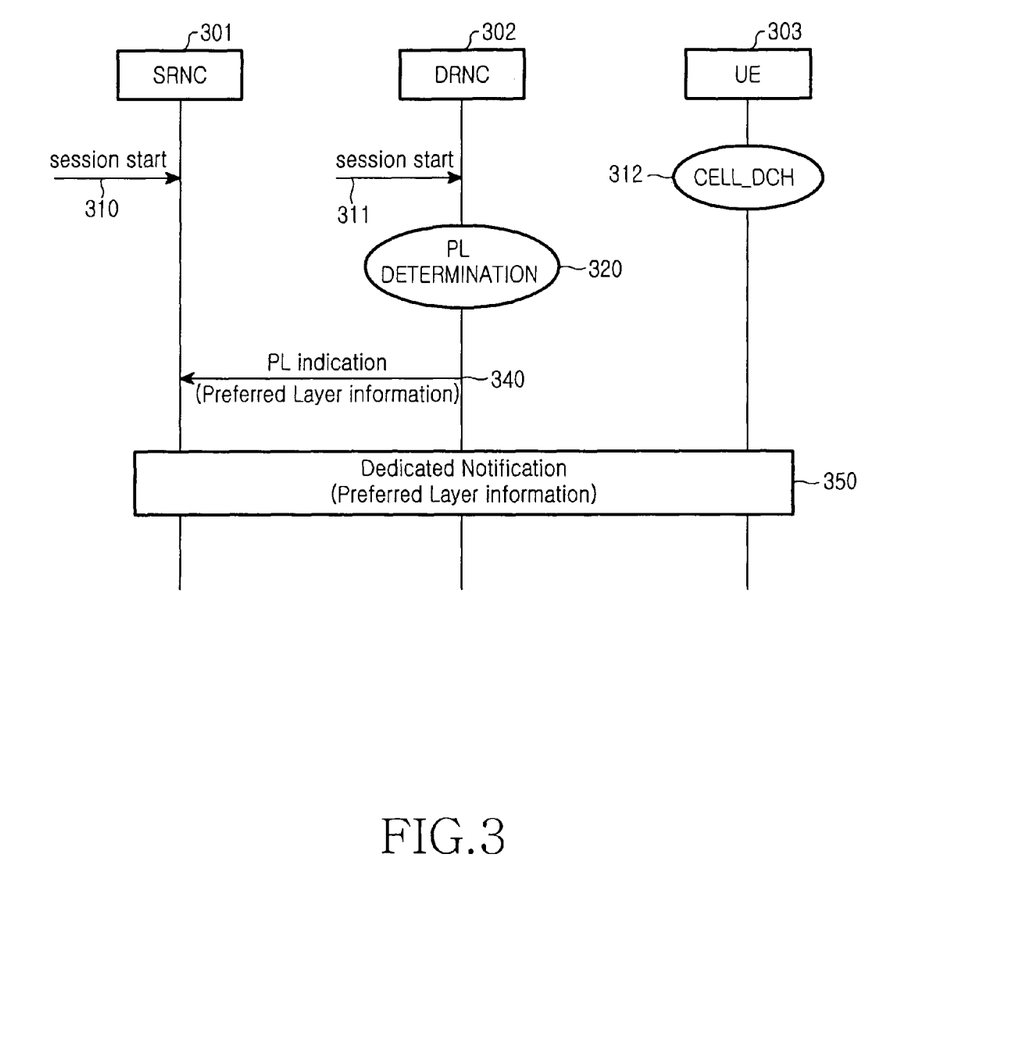
FIG. 3 is an exemplary flow diagram illustrating a message flow between RNCs and a UE according to an exemplary embodiment of the present invention.

FIG. 3 is an exemplary flow diagram illustrating a message flow between RNCs and a UE according to an exemplary embodiment of the present invention.

In steps 310 and 311, a Serving GPRS Support Node (SGSN) informs a SRNC 301 and a DRNC 302 that the session of a specific MBMS service starts, respectively. In steps 312, UE 303 is in a cell dedicated channel (CELL_DCH) state.

In step 320, the DRNC 302 determines information for loads of cells managed by the DRNC 302, a frequency at which an existing MBMS service is performed, and so on, thereby selecting a PL for the MBMS service. In step 340, the DRNC 302 transfers PL information representing the PL to the SRNC 301. In step 350, the SRNC 301 informs the UE 303 of the PL information through a dedicated notification procedure by using a DCCH.

In step 340, the transfer of the PL information between the DRNC 302 and the SRNC 301 is performed through a Preferred Layer (PL) indication message, which is a Radio Network System Application Part (RNSAP) message, or a channel type reconfiguration indication message.

In a modified exemplary embodiment regarding FIG. 3, the SRNC 301 may transmit a PL confirmation message to the DRNC 302 between step 340 and step 350 in order to report the successful reception of the PL information.

Figure 4A:
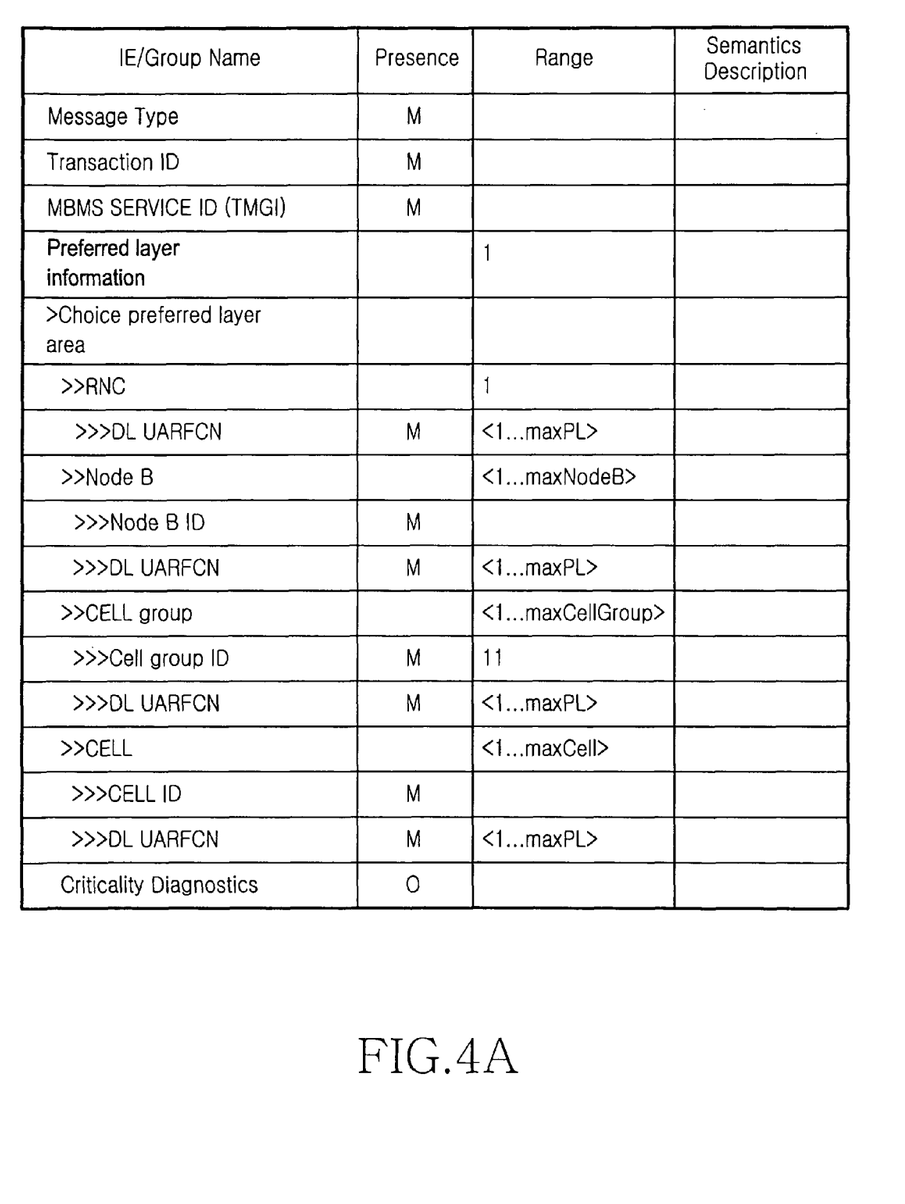
FIGS. 4a, 4b and 4c are exemplary diagrams respectively illustrating formats of a PL indication message and a channel type reconfiguration indication message according to an exemplary embodiment of the present invention.
Figure 4B:
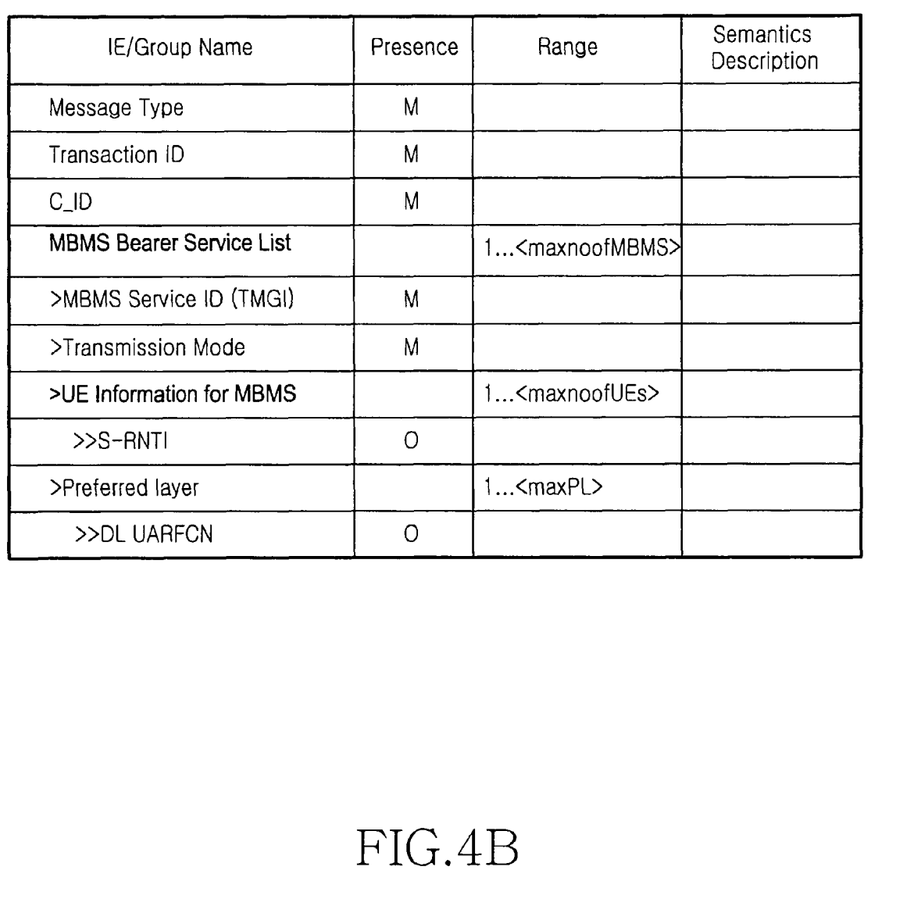

FIGS. 4a and 4b are exemplary diagrams respectively illustrating formats of a PL indication message and a channel type reconfiguration indication message according to an exemplary embodiment of the present invention.

As illustrated in the PL indication message of FIG. 4a, a RNC may establish a PL in various manners. That is, one MBMS service may also have the same PL in all cells managed by the RNC. Otherwise, the MBMS service may have different PLs according to each node B or each cell group including plural cells. In FIG. 4a, a maxNodeB, a maxCellGroup and a maxCell represent the number of node Bs, cell groups and cells under the control of a DRNC, respectively. A Downlink UTRA Absolute Radio Frequency Channel Number (DL UARFCN) represents a frequency layer selected as a PL. Further, the DL UARFCN representing the PL may be included in the message by the number of a maxPL, which is the number of PLs having been predetermined for the RNC, each node B, each cell group, or each cell, considering that various frequencies may also be established as the PL at one position.

In more detail, PL information represents maxPL number of PLs for the DRNC, maxPL number of PLs for maxNode B number of node Bs, maxPL number of PLs for maxCellGroup number of cell groups, or maxPL number of PLs for maxCell number of cells, in a selected PL domain.

When the PL information is to be transferred using the channel type reconfiguration indication message, maxPL number of DL UARFCNs representing PLs of each cell are included in a MBMS bearer service list of an existing channel type reconfiguration indication message.

The MBMS bearer service list further includes a Temporary Mobile Group Identity (TMGI) representing a MBMS service ID, a transmission mode, a SRNC-Radio Network Temporary Identity (S-RNTI) representing UE information for a MBMS, in order to reconfigure a channel type.

Figure 5:
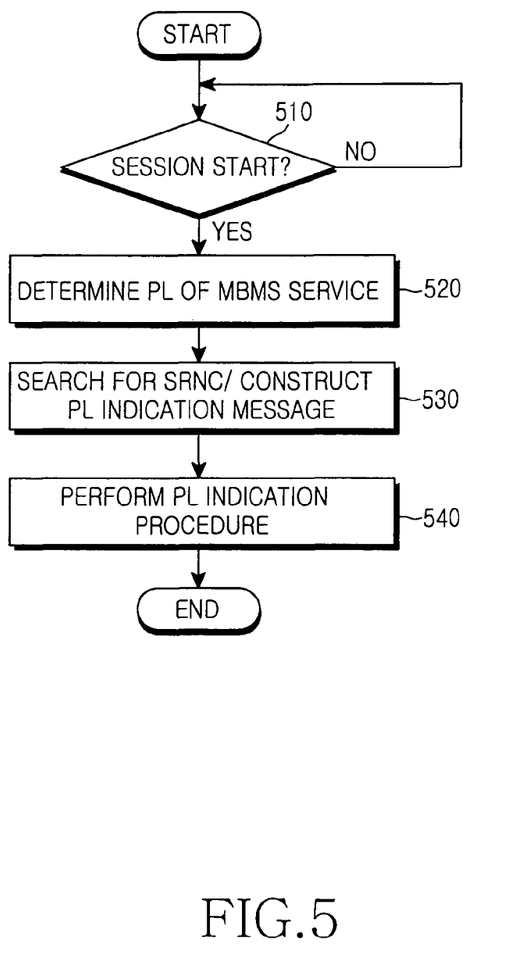
FIG. 5 is an exemplary flow diagram illustrating an operation of a Drift Radio Network Controller (DRNC) according to an exemplary embodiment of the present invention.

FIG. 5 is an exemplary flow diagram illustrating an operation of the DRNC according to an exemplary embodiment of the present invention.

FIG. 5 shows an example of using a PL indication message.

In step 510, the DRNC receives a MBMS session start message from a SGSN. In step 520, the DRNC determines the PL of a MBMS service. The DRNC determines the PL for a cell managed by the DRNC and node Bs of a cell group. In step 530, the DRNC searches for SRNCs of CELL_DCH UEs belonging to the DRNC, determines SRNCs to which the PL indication message is to be transmitted, and providing the PL indication message, which is to be transmitted to the determined SRNCs, by using information of the determined PL. In step 540, the DRNC transmits the PL indication message the determined SRNCs. In the modified exemplary embodiment as described above, the DRNC waits for PL confirmation messages from the SRNCs, and ends its own operation when successfully receiving the PL confirmation messages from the SRNCs.

Figure 6:
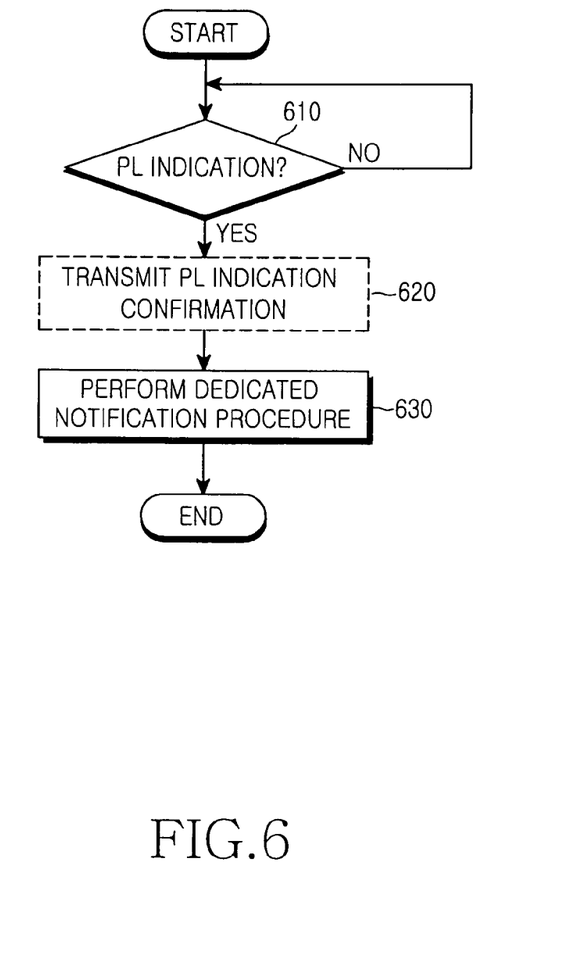
FIG. 6 is an exemplary flow diagram illustrating an operation of a SRNC according to an exemplary embodiment of the present invention.

FIG. 6 is an exemplary flow diagram illustrating an operation of the SRNC according to an exemplary embodiment of the present invention.

When the PL indication message is received from the DRNC in step 610, step 630 is performed. In step 630, the SRNC performs a dedicated notification procedure for informing CELL_DCH UEs located in cells controlled by the DRNC of the upcoming start of a MBMS session. Herein, step 630 may be performed after the SRNC transmits the PL confirmation messages to the DRNC in step 620 in order to inform the DRNC of success or failure in reception of the PL indication message.

Further, when the PL information is transferred by using the channel type reconfiguration indication message, it is apparent to those skilled in the art that the channel type reconfiguration indication/confirmation message may be used instead of the PL indication/confirmation message in steps 530 and 540 of FIG. 5 and steps 610 and 620 of FIG. 6.

According to an exemplary implementation of the present invention, an exemplary embodiment describes a method for reducing the size of a message when the DRNC determines a PL of each cell in a session start and then transfers information for the determined PL to the SRNC through the PL indication message in step 440 of FIG. 3.

The method of the exemplary embodiment is substantially the same as that of the previous exemplary embodiment, and the procedures of FIGS. 3, 5 and 6 in the previous exemplary embodiment are also applied to the current exemplary embodiment.

Figure 4C:
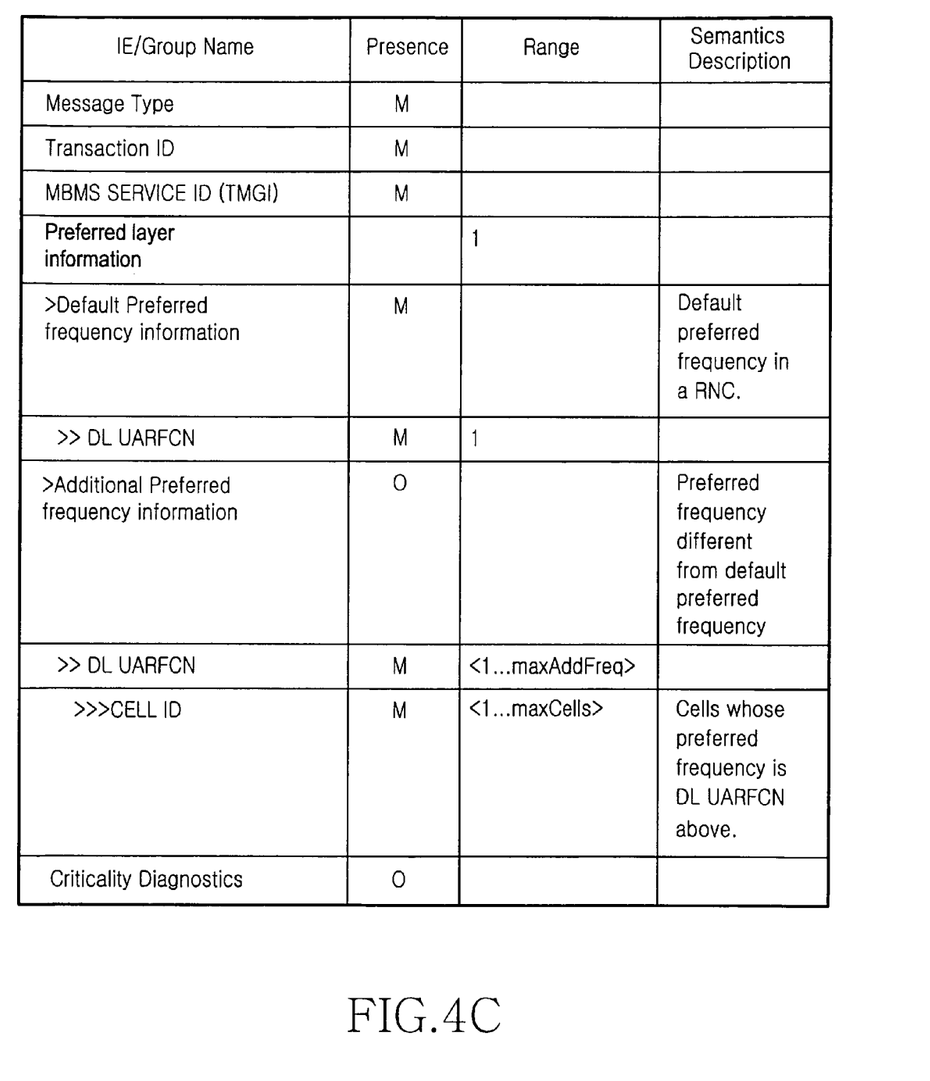

In an exemplary embodiment, the PL information of all cells controlled by the DRNC is not included in one message for transmission as shown in FIG. 4a in an exemplary embodiment. Instead, as shown in the format of FIG. 4c, only the PLs of cells, in which CELL_DCH UEs managed by the SRNC and controlled by the DRNC are stationary, are transferred.

Further, in an exemplary embodiment, in order to reduce the size of the PL information, the most frequent PL is established as the default-preferred frequency from among the PLs of the cells. Accordingly, the ID of a cell for which the default-preferred frequency was set is not separately transferred, and a cell ID list relating to each PL different from the default-preferred frequency is transferred by using additional PL information.

Figure 7:
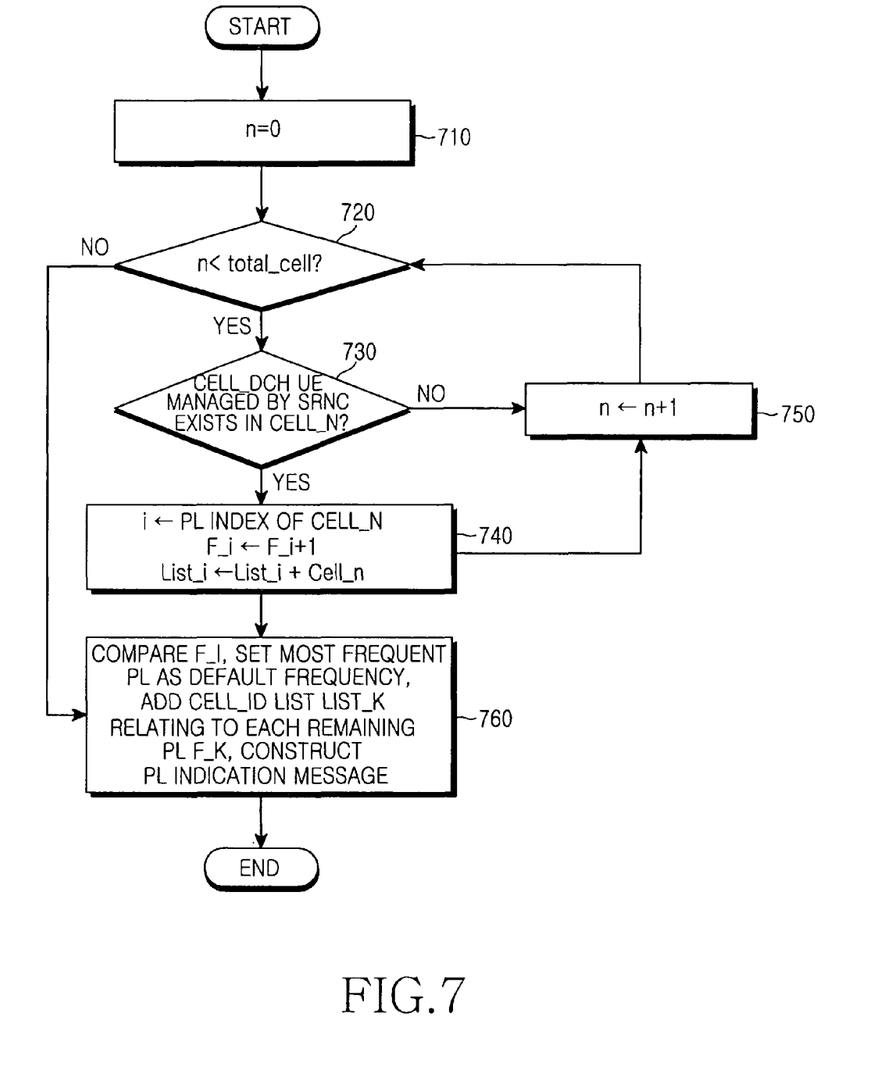
FIG. 7 is an exemplary flow diagram illustrating a construction operation of a PL indication message according to an exemplary embodiment of the present invention.

FIG. 7 is an exemplary flow diagram illustrating a construction operation of the PL indication message according to an exemplary embodiment of the present invention.

FIG. 7 describes in more detail the construction method of the PL indication message in step 530 of FIG. 5, which belongs to the operation of the DRNC according to an exemplary embodiment.

In step 710, the DRNC sets a cell count value "n" to 0. In step 720, the DRNC determines if the value n is less than the number "total_cell" of all cells controlled by the DRNC. If the value "n" is less than the number "total_cell" of all cells, step 730 is performed to determine if CELL_DCH UEs managed by the SRNC exist in a cell "n". If these CELL_DCH UEs exist, step 740 is performed. Otherwise, step 750 is performed.

In step 740, the DRNC increases a count value "F_I" of a frequency "i", which was set as a PL in the cell "n", by one, and adds a current cell ID "Cell_n" to a cell list "List_i" relating to the frequency "i". Then, step 750 is performed.

In step 750, the DRNC increases the cell count value "n" by one. Then, in step 720, the DRNC compares the value "n" with the value "total_cell" and determines if the counting process of steps 730, 740 and 750 has been completed for all cells managed by the DRNC. If the counting process has been completed for all cells, step 760 is performed.

In step 760, the DRNC compares the count values "F_I" of each PL "i" having been set in the counting process with each other, sets a PL having the largest count value as the default-preferred frequency, and generates a list of cell IDs relating to the other PLs. The PL indication message is included in default-preferred frequency information for representing the default-preferred frequency and additional preferred frequency information including cell lists of remaining preferred frequencies.

Figure 8:
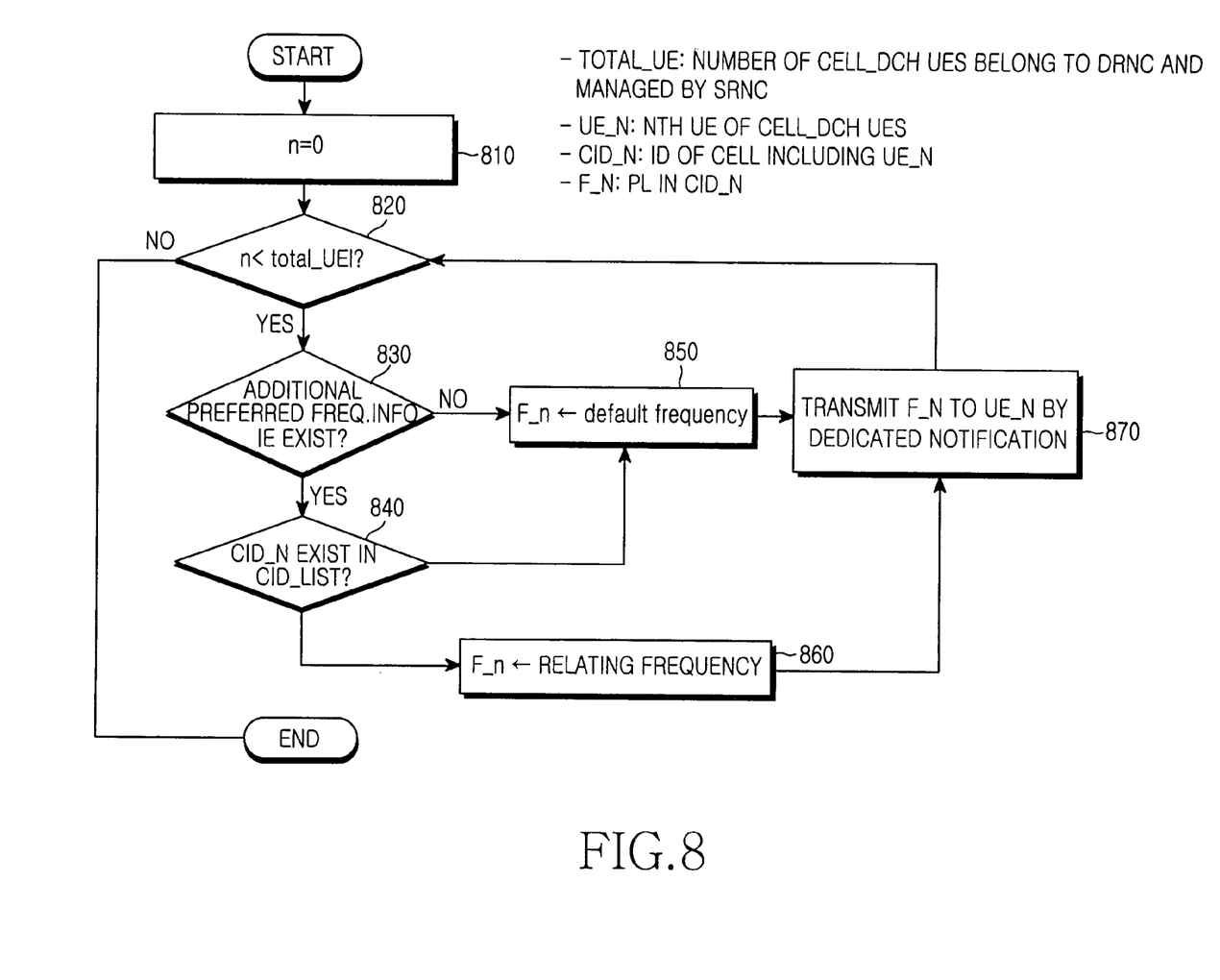
FIG. 8 is an exemplary flow diagram illustrating a dedicated notification procedure performance step in an operation of a Serving Radio Network Controller (SRNC) according to an exemplary embodiment of the present invention.

FIG. 8 is an exemplary flow diagram illustrating the dedicated notification procedure performance step in the operation of the SRNC according to an exemplary embodiment of the present invention. FIG. 8 describes in greater detail the dedicated notification procedure performance step in step 630 of FIG. 6, which belongs to the operation of the SRNC according to an exemplary embodiment.

In step 810, the SRNC sets a UE count value "n" to 0. In step 820, the SRNC determines if the value "n" is less than the number "total_UE" of all UEs having dedicated channels and controlled by the DRNC. If the value "n" is less than the number "total_cell" of all UEs, step 830 is performed to determine if the additional preferred frequency information exists in the PL indication message received from the DRNC. If the PL indication message does not exist in the PL indication message, step 850 is performed. In step 850, the SRNC sets a preferred frequency of a UE_n as the default-preferred frequency included in the PL indication message. Then, in step 870, the SRNC transmits a dedicated notification message including information for the set preferred frequency to the UE_n.

However, if the PL indication message exists in the PL indication message in step 830, the SRNC determine if an ID "CID_n" of a cell including the UE_n is included in the cell ID list "CID_list" of the additional preferred frequency information in step 840. If the "CID_n" is not included in the list, step 850 is performed. That is, in step 850, the SRNC sets the preferred frequency of the UE_n as the default-preferred frequency. Then, in step 870, the SRNC transmits the dedicated notification message including information for the set preferred frequency to the UE_n. However, if the "CID_n" is included in the list, the SRNC sets a preferred frequency relating to the list as the preferred frequency of the UE_n in step 860 and transmits the dedicated notification message including information for the set preferred frequency to the UE_n in step 870.

Steps as described above are repeated for all CELL_DCH UEs controlled by the DRNC. Further, if the value "n" is not less than the number of all UEs currently controlled by the DRNC, the procedure ends.

According to exemplary embodiments of the present invention as described above, a DRNC determines a preferred frequency of a specific MBMS session and transfers information for the preferred frequency to a SRNC, thereby allowing the SRNC to transmit the information for the preferred frequency to UEs having dedicated channels.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transferring preferred frequency information in a mobile communication system which establishes a preferred frequency layer and a non-preferred frequency layer for a Multimedia Broadcast/Multicast Service (MBMS) service, the method comprising the steps of:

determining at least one preferred frequency of the MBMS service in a drift radio network controller when a session of the MBMS service starts;

generating the preferred frequency information representing said at least one preferred frequency in the drift radio network controller; and transmitting the preferred frequency information from the drift radio network controller to at least one serving radio network controller for managing communication of user equipments intended to receive the MBMS service.

2. The method as claimed in claim 1, wherein the preferred frequency information comprises:

default-preferred frequency information representing the default-preferred frequency selected for cells, in which user equipments exist, and additional preferred frequency information representing corresponding cells for each of remaining preferred frequencies excluding the default-preferred frequency, the user equipments having dedicated channels and being managed by said at least one serving radio network controller.

3. The method as claimed in claim 1, wherein the preferred frequency information is included in a Radio Network System Application Part (RNSAP) message and transferred from a drift radio network controller for managing the cells including the user equipments to said at least one serving radio network controller.

4. The method as claimed in claim 3, wherein the RNSAP message comprises at least one of a preferred layer indication message and a channel type reconfiguration indication message.

5. The method as claimed in claim 1, wherein the preferred frequency information represents at least one of preferred frequencies allocated to each radio network controller, each node B, each cell group and each cell for the MBMS service.

6. The method as claimed in claim 1, further comprising a step of receiving a confirmation message for reporting a successful reception of the preferred frequency information from said at least one serving radio network controller.

7. The method as claimed in claim 1, further comprising a step of searching for user equipments intended to receive the MBMS service and having dedicated channels and confirming said at least one serving radio network controller for managing the communication of the user equipments.

8. The method as claimed in claim 1, wherein the preferred frequency information represents preferred frequencies of cells in which user equipments are stationary, the user equipments being intended to receive the MBMS service and having dedicated channels.

9. A method for transferring preferred frequency information in a mobile communication system which establishes a preferred frequency layer and a non-preferred frequency layer for a Multimedia Broadcast/Multicast Service (MBMS) service, the method comprising the steps of:
receiving the preferred frequency information, which is determined in a drift radio network controller, representing at least one preferred frequency of the MBMS service from the drift radio network controller for managing cells which include user equipments intended to receive the MBMS service when a session of the MBMS service starts; and
notifying the user equipments intended to receive the MBMS service of said at least one preferred frequency according to the preferred frequency information.

10. The method as claimed in claim 9, wherein the preferred frequency information comprises:
default-preferred frequency information for the cells, in which the user equipments having dedicated channels exist, and
additional preferred frequency information, and the additional preferred frequency information is selectively included in the preferred frequency information.

11. The method as claimed in claim 10, wherein the step of notifying the user equipments of said at least one preferred frequency comprises the steps of:
determining if the additional preferred frequency information is included in the preferred frequency information received from the drift radio network controller;
setting preferred frequencies of all cells, in which the user equipments controlled by the drift radio network controller and having the dedicated channels exist, as a default-preferred frequency included in the preferred frequency information, when the additional preferred frequency information is not included in the preferred frequency information;
determining if corresponding cell IDs are included in a cell ID list of the additional preferred frequency information with respect to each cell in which the user equipments having the dedicated channels exist, when the additional preferred frequency information is included in the preferred frequency information;
setting preferred frequencies of cells not included in the cell ID list as the default-preferred frequency;
setting preferred frequencies of cells included in the cell ID list as a preferred frequency relating to the cell ID list; and
notifying the user equipments having the dedicated channels of the preferred frequencies, which was set for said all cells, through a dedicated control channel.

12. The method as claimed in claim 9, wherein the preferred frequency information is included in a Radio Network System Application Part (RNSAP) message and transferred from a drift radio network controller for managing the cells including the user equipments to said at least one serving radio network controller.

13. The method as claimed in claim 12, wherein the RNSAP message comprises at least one of a preferred layer indication message and a channel type reconfiguration indication message.

14. The method as claimed in claim 9, wherein the preferred frequency information represents at least one of preferred frequencies allocated to each radio network controller, each node B, each cell group and each cell for the MBMS service.

15. The method as claimed in claim 9, further comprising a step of transmitting a confirmation message for reporting a successful reception of the preferred frequency information to the drift radio network controller.

16. An apparatus for transferring preferred frequency information in a mobile communication system which establishes a preferred frequency layer and a non-preferred frequency layer for a Multimedia Broadcast/Multicast Service (MBMS) service, the apparatus comprising:
a serving radio network controller for managing user equipments intended to receive the MBMS service; and
a drift radio network controller for determining at least one preferred frequency of the MBMS service when a session of the MBMS service starts, generating the preferred frequency information representing said at least one preferred frequency, and transmitting the preferred frequency information to the serving radio network controller,
wherein the serving radio network controller receives the preferred frequency information from the drift radio network controller, and notifies the user equipments intended to receive the MBMS service of said at least one preferred frequency according to the preferred frequency information.

17. The apparatus as claimed in claim 16, wherein the preferred frequency information comprises:
default-preferred frequency information representing one default-preferred frequency selected from cells including user equipments, and
additional preferred frequency information representing corresponding cells for each of remaining preferred frequencies excluding the default-preferred frequency, the user equipments having dedicated channels and being managed by the serving radio network controller.

18. The apparatus as claimed in claim 16, wherein the serving radio network controller determines if additional preferred frequency information is included in the preferred frequency information received from the drift radio network controller,
sets preferred frequencies of all user equipments having the dedicated channels and controlled by the drift radio network controller as a default-preferred frequency included in the preferred frequency information, when the additional preferred frequency information is not included in the preferred frequency information,
determines if IDs of corresponding cells are included in a cell ID list of the additional preferred frequency information with respect to each cell in which the user equipments having the dedicated channels exist, when the additional preferred frequency information is included in the preferred frequency information,
sets preferred frequencies of cells not included in the cell ID list as the default-preferred frequency,
sets preferred frequencies of cells included in the cell ID list as a preferred frequency relating to the cell ID list, and
notifies user equipments of the preferred frequencies, which have been set for said all cells, the user equipments being located in the corresponding cells and having the dedicated channels.

19. The apparatus as claimed in claim 16, wherein the preferred frequency information is included in a Radio Network System Application Part (RNSAP) message and transferred from the drift radio network controller to the serving radio network controller.

20. The apparatus as claimed in claim 19, wherein the RNSAP message comprises a preferred layer indication message or a channel type reconfiguration indication message.

21. The apparatus as claimed in claim 16, wherein the preferred frequency information represents at least one of preferred frequencies allocated to each radio network controller, each node B, each cell group and each cell for the MBMS service.

22. The apparatus as claimed in claim 16, wherein the serving radio network controller transmits a confirmation message for reporting a successful reception of the preferred frequency information to the drift radio network controller.

23. The apparatus as claimed in claim 16, wherein the drift radio network controller searches for user equipments intended to receive the MBMS service and having dedicated channels, and confirms the serving radio network controller for managing communication of the user equipments.

* * * * *